Patented Feb. 28, 1950

2,499,231

UNITED STATES PATENT OFFICE 2,499,231

METHOD OF PRODUCING SURFACE CONVERSION COATINGS ON ZINC

Jesse E. Stareck, Birmingham, Mich., assignor to United Chromium, Incorporated, New York, N. Y., a corporation of Delaware No Drawing. Application August 25, 1944, Serial No. 551,260

1 Claim. (Cl. 204—35)

This invention relates to transparent surface conversion coatings on zinc and methods of producing the same.

The invention provides a transparent (colorless) surface conversion coating, through which the metallic zinc coating is visible, and thereby provides coated articles having the appearance of metallic zinc. The coated article has advantages over an uncoated zinc (or zinc plated) article, the coating having a high abrasion resistance, not exhibiting fingermarks when handled and the coated articles having good corrosion resistance, the salt spray resistance being especially good. The brightness and lustre of the zinc on which the coating is produced is better after the coating is applied than before.

According to the present invention a yellow surface conversion coating is produced on zinc according to the method described in the patent of Stareck & Corliss No. 2,469,015, dated May 3, 1949; and the article with the yellow coating is immersed in hot water for some minutes or in a mild alkaline solution. The yellow coating consists mainly of oxides and chromates of zinc, with some alkali-metal chromate occluded from the solution. The coating, after treatment, is colorless, or transparent, with no appreciable change in composition other than removal of the occluded soluble chromates.

Perspiration on zinc surfaces causes discolorations, and on bright zinc surfaces which are handled, fingermarks are clearly visible. Articles processed according to the present invention can be handled without being discolored. The coating, as stated above, is resistant to abrasion, so that again there is the advantage of an article having the appearance of bright lustrous zinc, which is not marred by one article rubbing against another, as would occur with bright zinc articles not having the protection of the coating of this invention. The resistance to atmospheric corrosion of zinc surfaces having the coating of the present invention is excellent.

An example of a bath and of a mode of procedure in carrying out the method according to the present invention follows.

EXAMPLE I

*Production of yellow surface conversion coating on zinc (zinc article as anode)*

Bath solution:
    $Na_2Cr_2O_7 \cdot 2H_2O$ _____ 175 g./l.
    $Na_2CrO_4$ _____ 25 g./l.
    $Na_2SiF_6$ _____ Excess of solubility
    $SrSO_4$ _____ Excess of solubility
    pH _____ 5.5–6
    Current density ____ 3–30 amps./sq. ft.
    Temperature _____ 70° F.

*Removal of yellow color*

Bath _____ Hot water
Temperature _____ 212° F.
Immersion time _____ 5 to 15 minutes depending on thickness of coating The hot water bath may be speeded in its activity by the addition of a conducting salt, such as, for example, a carbonate, silicate, phosphate, borate and others.

The yellow surface conversion coating can be produced by other specific modes of procedure, as disclosed in said Stareck & Corliss patent.

Said process of forming yellow surface conversion coatings on zinc, as disclosed and claimed in said Stareck and Corliss Patent No. 2,469,015, may be summarized as follows:

A zinc or zinc coated article, as an anode, is immersed in an aqueous solution containing a hexavalent chromium compound and an activating acid radical of the fluoride type, within ratio ranges $Cr^{VI}$ to $SiF_6$ of 20:1 to 60:1 (optimum 30:1 to 40:1) and having a pH between 3 and 7 (optimum 5.5 to 6) and current passed to develop a yellow surface conversion coating on zinc. The hexavalent chromium compound may comprise a soluble alkali-metal chromate or dichromate or chromic acid. The fluoride type auxiliary acid radical may also be a fluoride radical, which has about 2½ times the effectiveness of the $SiF_6$ radical. The $Cr^{VI}$ to F ratio, equivalent to the $Cr^{VI}$ to $SiF_6$ ratio is 50:1 to 150:1, and the equivalent pH is the same as for the bath containing the $SiF_6$ radical.

The baths are used at room temperature, and the current densities used are from about 2 amperes to 50 amperes per square foot.

A specific procedure for producing the yellow surface conversion coating is given in a preceding part of this specification. In addition there is the knowledge of the art resulting from the extensive use of the Stareck and Corliss invention.

What is claimed is:

A method of making surface conversion coatings on zinc, which are formed by passing current at 2 to 50 amperes per square foot to the zinc surface connected as anode, immersed at room temperature in an aqueous solution consisting essentially of a soluble chromate and a silicofluoride auxiliary acid radical in a proportion of $Cr^{VI}$ to $SiF_6$ within the range 20:1 to 60:1 and having a pH between 3 and 7, transparent so as to exhibit the color of the underlying metallic zinc, which comprises soaking articles having said surface conversion coatings thereon in hot water until the coating becomes transparent.

JESSE E. STARECK.

(References on following page)

REFERENCES CITED

The following references are of record in the file of this patent:

UNITED STATES PATENTS

| Number | Name | Date |
|---|---|---|
| 1,827,247 | Mason | Oct. 13, 1931 |
| 1,853,323 | Schulein | Apr. 12, 1932 |
| 2,021,592 | Dubpernell et al. | Nov. 19, 1935 |
| 2,035,380 | Wilhelm | Mar. 24, 1936 |
| 2,060,192 | Gilbert | Nov. 10, 1936 |
| 2,288,007 | Lum | June 30, 1942 |
| 2,313,456 | Stareck | Mar. 9, 1943 |
| 2,433,723 | Wieczorek | Dec. 20, 1947 |

FOREIGN PATENTS

| Number | Country | Date |
|---|---|---|
| 706,347 | Germany | May 24, 1941 |

OTHER REFERENCES

Gilman, Inorganic Reactions (1929), page 265.